(12) United States Patent
George (10) Patent No.: US 6,431,962 B1
(45) Date of Patent: *Aug. 13, 2002

(54) METHOD AND APPARATUS FOR MAKING A CUTTING TOOL HAVING A FLUTE

(75) Inventor: Stephen M. George, North Augusta, SC (US)

(73) Assignee: Kennametal Inc., Latrobe, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/680,359

(22) Filed: Oct. 5, 2000

(51) Int. Cl.$^7$ ............................................... B24B 19/04
(52) U.S. Cl. ......................................... 451/47; 451/548
(58) Field of Search ............................. 451/47, 48, 220, 451/541, 548

(56) References Cited

U.S. PATENT DOCUMENTS

| | | |
|---|---|---|
| 1,151,247 A | 8/1915 | Denk |
| 1,415,879 A | 5/1922 | Lacy |
| 1,466,378 A | 8/1923 | McLaughlin |
| 1,981,445 A | 11/1934 | Aker ............................... 51/95 |
| 2,477,730 A | 8/1949 | Fouquet ........................... 51/95 |
| 2,664,681 A | 1/1954 | Clark et al. .................... 51/283 |
| 2,972,839 A | 2/1961 | Erdélyi .......................... 51/124 |
| 3,212,167 A | 10/1965 | Connelly ...................... 29/103 |
| 4,442,637 A | * 4/1984 | Ahejew ........................ 451/48 |
| 4,744,705 A | 5/1988 | Imanaga ..................... 408/230 |
| 5,075,549 A | 11/1991 | Speiser et al. .................. 51/288 |
| 5,681,207 A | * 10/1997 | Nishida et al. ................ 451/47 |
| D415,774 S | 10/1999 | Wakai ....................... D15/139 |
| 6,089,337 A | 7/2000 | Kleine et al. ................. 175/394 |
| 6,113,321 A | 9/2000 | Mulroy et al. ............... 408/211 |
| 6,190,097 B1 | 2/2001 | Thomas ....................... 408/230 |

FOREIGN PATENT DOCUMENTS

| | | |
|---|---|---|
| FR | 919163 | 2/1947 |
| JP | 2000263307 | 9/2000 |
| SU | 948624 | 8/1982 |

OTHER PUBLICATIONS

Related U. S. Application Ser. No. 09/680,361, filed Oct. 5, 2000.
Related U. S. Application Ser. No. 09/680,358, filed Oct. 5, 2000.
Related U. S. Design Application Ser. No. 29/130,605, filed Oct. 5, 2000.
Article titled "A Mathematical Model of the Grinding Wheel Profile Required for a Specific Twist Drill Flute", form Int. J. Mach. Tool Desigh Res. vol. 22, No. 4, pp 239–251, 1982.
Article titled "On the design of Milling Cutters or Grinding Wheels. . . A Cad Approach" Proceedings of the Twentyi-Fifth International Machine Tool Design and Research Conference., undated, 7 pp.
Article titled "Getting the "Hole" Answer", from Modern Machine Shop, Jun. 1985.
"Computer–Aided Modelling of the Fluting Process for Twist Drill Design and Manufacture", 6 pp., Annals of the CIRP vol. 47/1/1998.
Brooke Cutting Tools, Inc. catalog UD Twist Drills, 4 PP., undated.
SGH Hi–Percarb™ High Performance Carbide Drill Catalog EDP No. 00044 entitled "Increase production rates up to 12 times over conventional carbide drills", 4 pp., ©1998 SGS Tool Company.

* cited by examiner

Primary Examiner—Joseph J. Hail, III
Assistant Examiner—David B. Thomas
(74) Attorney, Agent, or Firm—Kevin P. Weldon (57) ABSTRACT

A grinding wheel for producing a cutting tool having a flute and a land with a margin which follow a helix angle is disclosed along with a method for using such a grinding wheel. Additionally, a crush roll for dressing such a grinding wheel is disclosed.

46 Claims, 8 Drawing Sheets

METHOD AND APPARATUS FOR MAKING A CUTTING TOOL HAVING A FLUTE

BACKGROUND OF THE INVENTION

1. Field of the Invention

This invention is directed to a method and apparatus for making a cutting tool having at least one helical flute and land and having a margin on the land. In particular, the invention is directed to a single grinding wheel and method of using such a grinding wheel to produce both the flute and land portions of the cutting tool, including a margin associated with the land.

This invention is also directed to a crush roll used to form such a grinding wheel.

2. Description of Related Art

A cutting tool, such as a twist drill, is generally comprised of a cylindrical shaft having at least one flute and land, wherein the flute and the land follow a helical angle to a forward cutting edge of the forward end of the shaft. The flute has associated with it a lip and an adjacent nose. The land has associated with it a clearance portion and a margin adjacent to the clearance portion. A side cutting edge is defined by the intersection of the lip with the margin of the land. Associated with the land of the cutting tool may be a single margin or, in some instances, a double margin wherein one margin is on each side of the land. In the past, production of such a cutting tool having both a helical flute and land with a margin required two separate grinding operations. In one operation, the flute would be ground with one grinding wheel, and in a separate operation the land would be ground with a second grinding wheel.

These two separate grinding operations require mounting the cutting tool on two separate grinding machines. Therefore, the cutting tool must be precisely mounted within each grinding machine to ensure the flute and land are ground along the same helical path. Additionally, the grinding machines must be set at the same lead angle to ensure the flute and land are ground along the same helix angle. If the cutting tool is not properly mounted and the flute and land are not ground correctly, the tool may be flawed such that it must be discarded. Furthermore, setup for two separate operations is not only time-consuming but also prone to error. Therefore, while the cutting tool could be ground using two grinding operations, a single grinding operation would be preferred.

A need exists to eliminate the need for two separate grinding operations to produce a drill having a margin through the use of a single grinding wheel and a method for using the same.

Finally, such a grinding wheel may be produced using single point dressing tools or CNC machines. However, each of these methods is time-consuming and expensive. As a result, a method and apparatus is desired for producing such a grinding wheel in a more efficient manner.

BRIEF SUMMARY OF THE INVENTION

The invention is directed to a grinding wheel for producing a helical cutting tool having a shaft with a longitudinal axis, wherein the cutting tool shaft has a forward end and, when viewed in cross-section perpendicular to the longitudinal axis and spaced from the forward end, the cutting tool is comprised of a flute having a radial depth and a land adjacent to the flute wherein the flute and the land extend about the longitudinal axis of the shaft along a helix angle. The flute has a lip extending inwardly from an outer radius and a nose adjacent to the lip. Each land has a clearance portion adjacent to the nose and a margin adjacent to the clearance portion. The grinding wheel is comprised of a disk having a disk centerline and an average radial size, a first side and a second side defining a width therebetween and a disk outer edge between the sides, wherein the outer edge has an abrasive material for grinding a cutting tool. The edge has a profile defined by:

a) a lip shaper segment extending in a lateral direction from the first side and extending away from the disk centerline a radial distance defining the radial depth of the flute;

b) a nose shaper segment adjacent to the lip shaper segment and extending in a lateral direction toward the second side and extending inwardly toward the disk centerline;

c) a clearance shaper segment adjacent to the nose shaper segment and extending in a lateral direction toward the second side; and d) a margin relief shaper segment adjacent to the clearance shaper segment and extending in lateral direction toward the second side and extending toward the disk centerline.

Another aspect of the invention is directed to a method of producing a helical cutting tool having a shaft with a longitudinal axis, wherein the cutting tool shaft has a forward end and, when viewed in cross-section perpendicular to the longitudinal axis and spaced from the forward end, has a flute with a radial depth and has a land adjacent to the flute. The flute and the land extend about the longitudinal axis of the shaft along a helix angle. The flute has a lip extending inwardly from an outer radius and a nose adjacent to the lip and wherein each land has a clearance portion adjacent to the nose and a margin adjacent to the clearance portion. The method comprises the step of:

a) producing both the flute and land of the cutting tool by grinding the shaft with at least one pass of a grinding wheel.

Yet another aspect of the invention is directed to a cutting tool having a shaft with a longitudinal axis and a forward end and, when viewed in cross-section perpendicular to the longitudinal axis and spaced from the forward end, the cutting tool is comprised of a flute having a radial depth and a land adjacent to the flute. The flute and land extend about the longitudinal axis of the shaft along a helix angle. The flute has a lip extending inwardly from an outer radius and a nose adjacent to the lip and wherein each land has a clearance portion adjacent to the nose and a margin adjacent to the clearance portion, wherein the cutting tool is produced with a method comprising the step of:

a) producing both the flute and land of the cutting tool by grinding the shaft with at least one pass of a single grinding wheel.

Yet another aspect of the invention is directed to a crush roll for dressing a grinding wheel, wherein the grinding wheel is used to produce a helical cutting tool having a shaft with a longitudinal axis. The cutting tool shaft has a forward end and, when viewed in cross-section perpendicular to the longitudinal axis and spaced from the forward end, is comprised of a flute having a radial depth and a land adjacent to the flute. The flute and the land extend about the longitudinal axis of the shaft along a helix angle. The flute has a lip extending inwardly from an outer radius and a nose adjacent to the lip and wherein each land has a clearance portion adjacent to the nose and a margin adjacent to the clearance portion. The crush roll is comprised of a disk having a disk centerline and an average radial size, a first side and a second side defining a width therebetween and a disk outer edge between the sides, wherein the sides and edge have an abrasive material for dressing the grinding wheel. The edge has a profile defined by:

a) a lip former segment extending in a lateral direction from the first side and extending toward the disk centerline a radial distance defining the radial depth of the flute;

b) a nose former segment adjacent to the lip shaper segment and extending in a lateral direction toward the second side and extending outwardly away from the disk centerline;

c) a clearance former segment adjacent to the nose former segment and extending in a lateral direction toward the second side; and d) a margin relief former segment adjacent to the clearance former segment and extending in a lateral direction toward the second side and extending away from the disk centerline.

DETAILED DESCRIPTION OF THE INVENTION

The Cutting Tool

Figure 1:
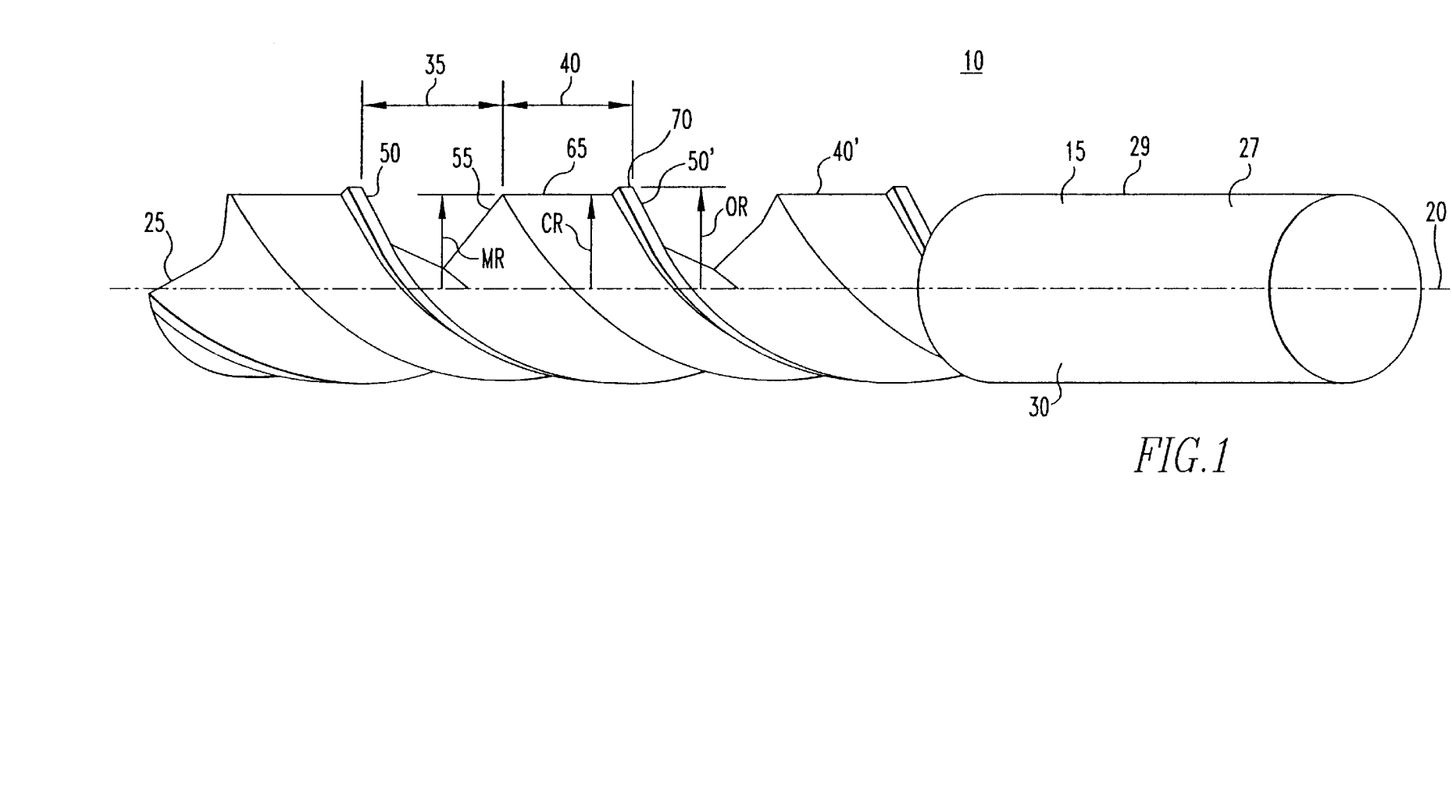
FIG. 1 illustrates an isometric view of a cutting tool having a single margin fabricated by the present invention.

The subject invention is directed to a method and apparatus for producing a cutting tool having a helical flute and land wherein the land has a margin at each side of the land. For purposes of explanation, a twist drill will be discussed, and having a margin at one side of the clearance. However, it should be understood that the subject invention is applicable to other cutting tools having helical flutes such as, for example, endmills, taps, reamers and hobs. Such cutting tools may or may not have a forward end capable of contacting and cutting a workpiece. As a background, FIG. 1 shows a twist drill 10 having a generally cylindrical shaft 15 with a longitudinal axis 20. The shaft 15 has a forward end 25 capable of contacting and cutting a workpiece (not shown). The shaft has an external surface 30 wherein the external surface 30 has a flute 35 and a land 40 adjacent thereto.

At the rearward end 27 of the shaft 15 is a shank 29 which may be generally cylindrical or may have a non-cylindrical shape to fit within a chuck (not shown). While the shank 29 is illustrated as cylindrical, it should be clear that the shank may be square, hexagonal, conical or any other suitable non-cylindrical shape for gripping within a chuck. Additionally, when the shank 29 is cylindrical, it may have a radius greater to or less than the radius of the shaft 15.

Figure 2:
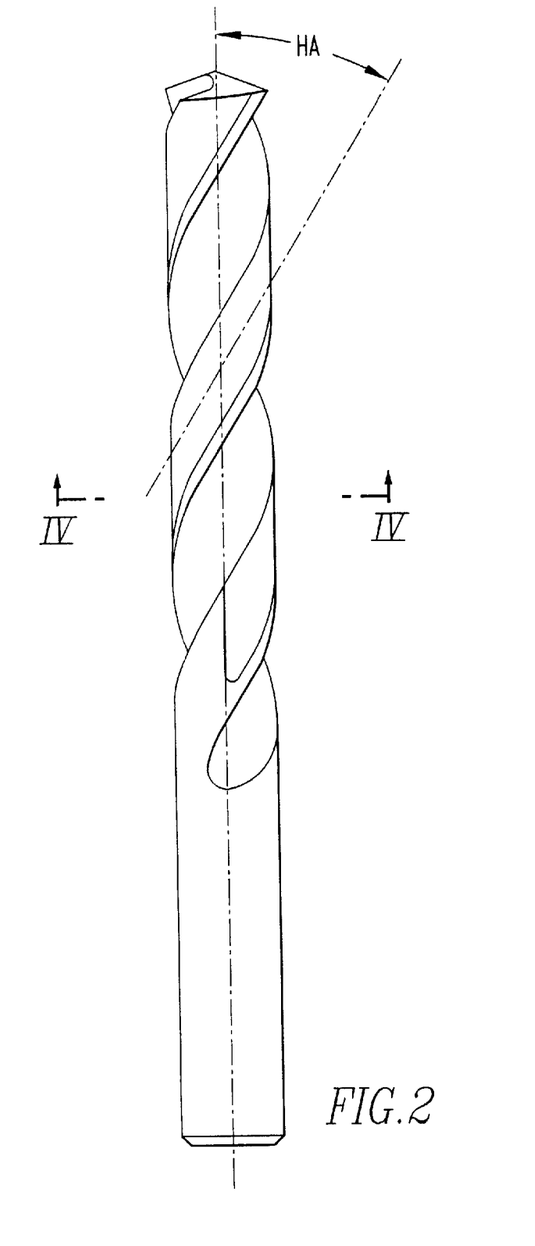
FIG. 2 is an elevation view of the cutting tool illustrated in FIG. 1.
Figure 3:
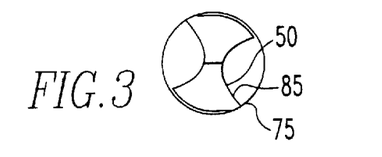
FIG. 3 is a top view of the cutting tool illustrated in FIG. 2.

The flute 35 and the land 40 extend about the longitudinal axis 20 of the shaft 15 along a helix angle HA (FIG. 2). Directing attention to FIGS. 1–4, the flute 35 is comprised of a lip 50 extending inwardly from an outer radius OR and a nose 55 adjacent to the lip 50.

Figure 4:
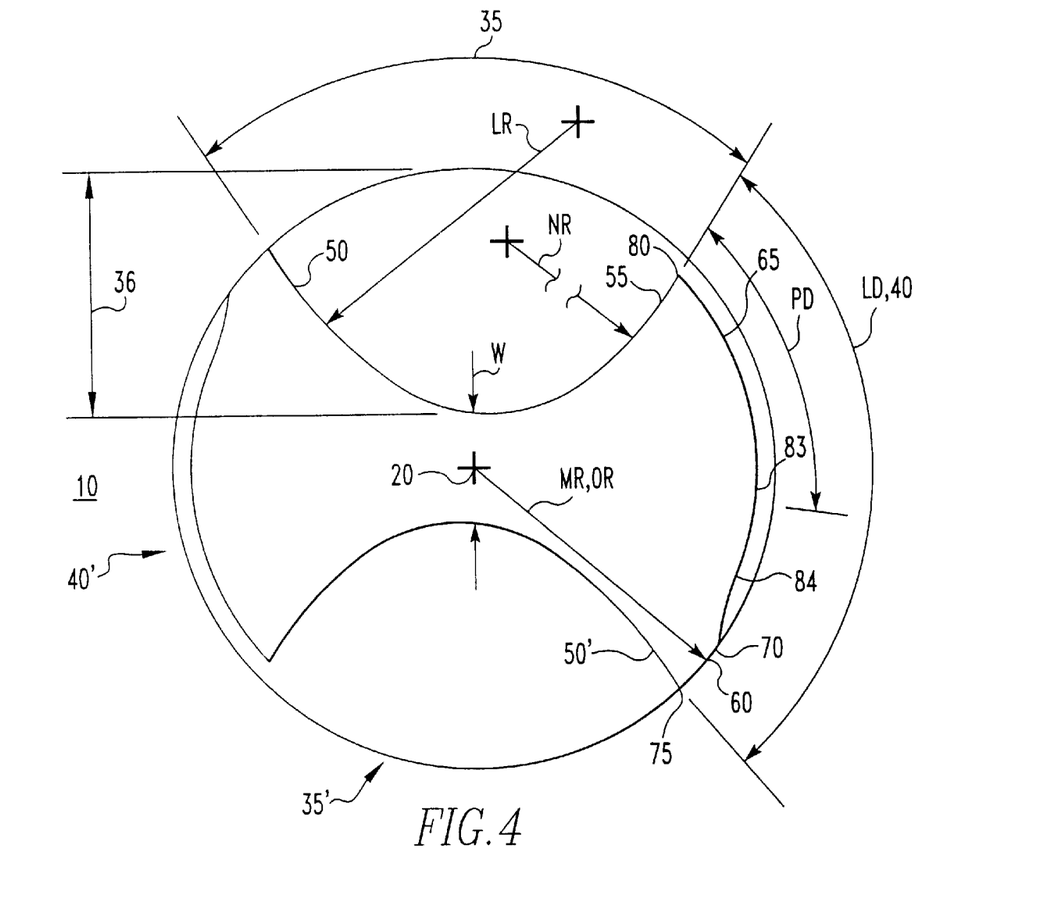
FIG. 4 is a section view along arrows IV—IV of FIG. 2.

The land 40 is adjacent to the flute 35 and extends about the longitudinal axis 20 along the helix angle HA a peripheral distance LD about the drill 10. The distance LD subtends an arc between 70° and 110°, and preferable about 90°. The land 40 has a clearance portion 65 which is adjacent to the nose 55 and is within an envelope circumscribed by the outer radius OR. In one embodiment illustrated in FIG. 1, the clearance portion 65 has a radius CR which is less than the outer radius OR. However, it may be possible for the clearance portion 65 to have a taper with a changing radius CR over its length. A margin 70 is adjacent to the clearance portion 65. This describes the flute 35 and the land 40. Beyond the margin 70 is a lip 50' which is associated with a different flute 35' and land 40' positioned in a different location along the shank 29 of the drill 10. Each flute 35, 35' may have a radial depth. In the event drill 10 had only a single flute, then flute 35' would be flute 35 rotated about the drill 10 a full revolution. In FIG. 4, because there are two flutes 35, 35' and two lands 40, 40', the land 40 is adjacent to the lip 50' of an adjacent flute 35' and intersects to form side cutting edge 75.

The drill illustrated in FIGS. 1–4 has two separate flutes and associated lands extending along its length. It should be appreciated that the cutting tool, in this instance a drill, may have a single flute or multiple flutes (e.g., two, three, four or more flutes) and associated lands.

Directing attention to FIG. 4, the smallest web thickness W of the drill 10 at the longitudinal axis 20 is less than the clearance peripheral distance PD of the clearance portion 65. The peripheral distance PD along the clearance portion 65 begins at the edge 80 of the clearance portion 65 and subtends an arc of about 60° to the edge 83 of margin relief portion 84.

The margin 70 in FIG. 1 is intentionally exaggerated for illustration purposes and is more accurately reflected in one embodiment of the subject invention by the details provided in FIG. 4.

The smallest web thickness W of the shaft 15 may be between 30–70% of the peripheral distance PD along the clearance portion 65. The smallest web thickness W of the shaft 15 may also be between 25–70% of the outer radius OR and, in a preferred embodiment, may be approximately 50% of the outer radius OR.

In a preferred embodiment, the smallest web thickness W of the shaft 15 is approximately 36% of the clearance peripheral distance PD between first margin 60 and second margin 70.

The lip 50, illustrated in FIG. 4, is concave and has a radius LR. However, when viewed from the forward end 25, a projection 85 of the lip 50 may be a straight line. In the alternative, and as viewed in FIG. 3, in certain circumstances the contour of this projection 85 may be curved, thereby providing a positive rake angle to the cutting edge 75 of the drill 10.

Returning to FIG. 4, the clearance portion 65 may be concentric with a clearance radius CR about the longitudinal axis 20, thereby providing structural support behind the cutting edge 75 at the margin 70. This feature is in contrast to a parabolic drill, which may have a clearance radius that decreases with peripheral distance away from the cutting edge 75.

At the transition between the clearance portion 65 and the margin 70, the margin relief portion 84 may be linear and ramped between the clearance portion 65 and the margin 70 or, in the alternative, may be curved.

As mentioned, FIGS. 1–4 illustrate a twist drill 10 having two flutes. It should be appreciated that drills manufactured using the method and apparatus of this invention are not limited to flutes and arrangements having a single flute. Multiple flutes may also be manufactured. In the event that additional flutes are included, then the twist drill will include additional flute/land pairs, wherein each pair extends along the longitudinal axis 20 of the shaft 15 and along the helix angle HA to form a plurality of flute/land pairs adjacent to one another along the drill shaft 15. One particular type of drill that may be fabricated in accordance with the subject method and apparatus of this invention may be a quarter-inch diameter drill having the following dimensions:

helix angle (HA)=32–35°
outer radius (OR)=0.125 inch
nose radius (NR)=0.240 inch
clearance radius (CR)=0.118 inch
margin radius (MR)=0.125 inch
lip radius (LR)=0.158 inch
web thickness (W)=0.048 inch A Grinding Wheel for Producing the Cutting Tool In the past, cutting tools having helical flutes and associated lands were commonly generated utilizing two separate grinding wheels and involved two separate grinding steps. As mentioned, not only were these two steps time-consuming, but proper alignment of the cutting tool after the first grinding operation was critical, such that the helical flutes and the associated lands with margins would be parallel to one another. Absent this relationship, the cutting tool would be considered defective such that they must be discarded.

The inventor has designed a single grinding wheel capable of simultaneously generating both the helical flute and associated land with a margin on a cutting tool. This design not only permits cutting tools to be manufactured faster, but furthermore, improves the degree of accuracy with which the cutting tools are formed and eliminates scrap caused when the flute and the land are not parallel to one another.

Figure 5:
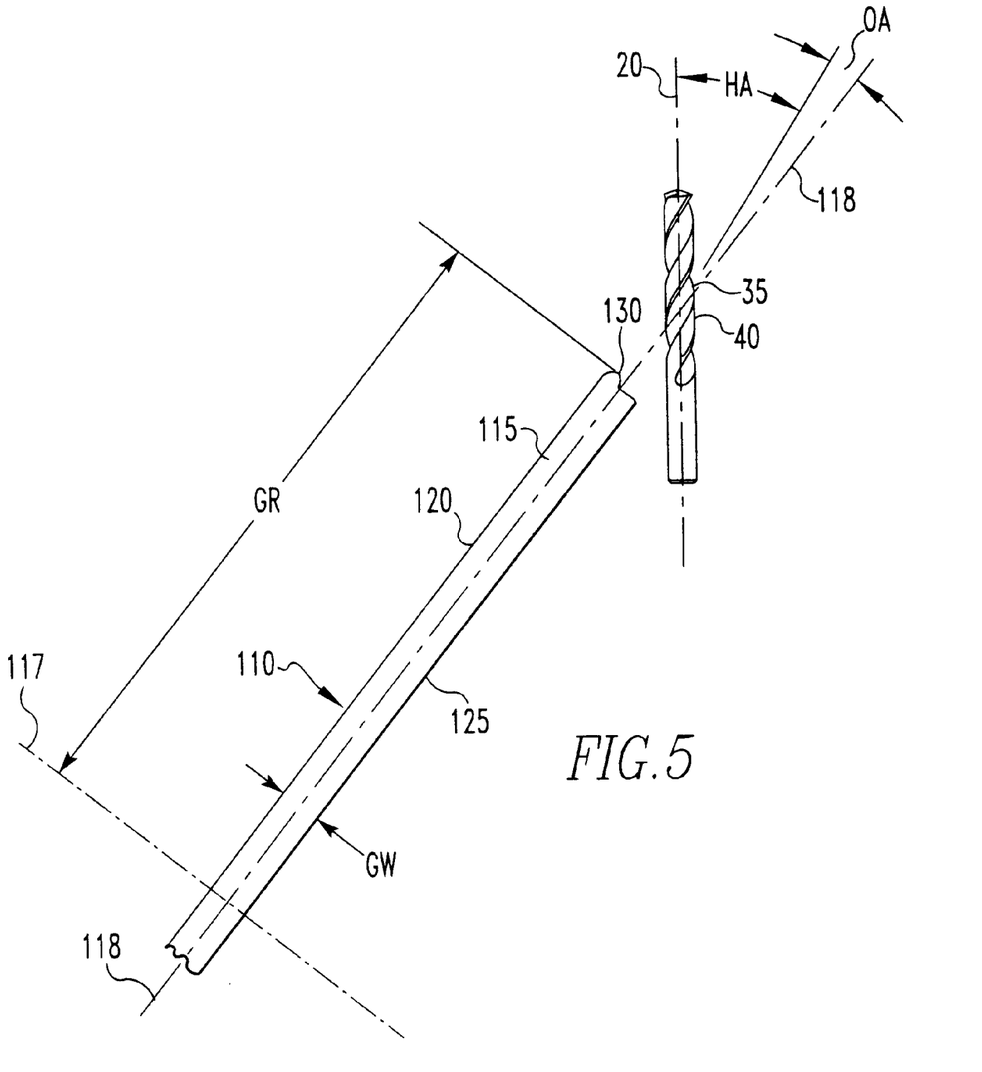
FIG. 5 is a sketch illustrating a view along the offset angle of a grinding wheel positioned adjacent to but spaced from a finished cutting tool.

FIG. 5 illustrates a grinding wheel 110 for producing the helical cutting tool 10 previously described. The grinding wheel 110 is comprised of a disk 115 having a disk centerline 117, a maximum radius GR and a longitudinal axis 118. The maximum radius GR also defines an average radial size. The disk 115 has a first side 120 and an opposing second side 125 defining a width GW therebetween. A disk outer edge 130 extends between the sides 120, 125. The outer edge 130 has an abrasive material thereupon for grinding a cutting tool 10. Such an abrasive material may be any of a number of typical materials used to grind metal, including but not limited to silicon carbide, cubic boron nitride, aluminum oxide or diamond. A typical grinding wheel may be fabricated of a resin-bonded material such as silicon carbide. Resin bond wheels are suitable for applications involving shock and deflection. Therefore, the structure is weak enough for them to work effectively on surface grinders with low speed and horsepower capabilities. Alternately, metal bond grinding wheels may also be used.

Figure 6:
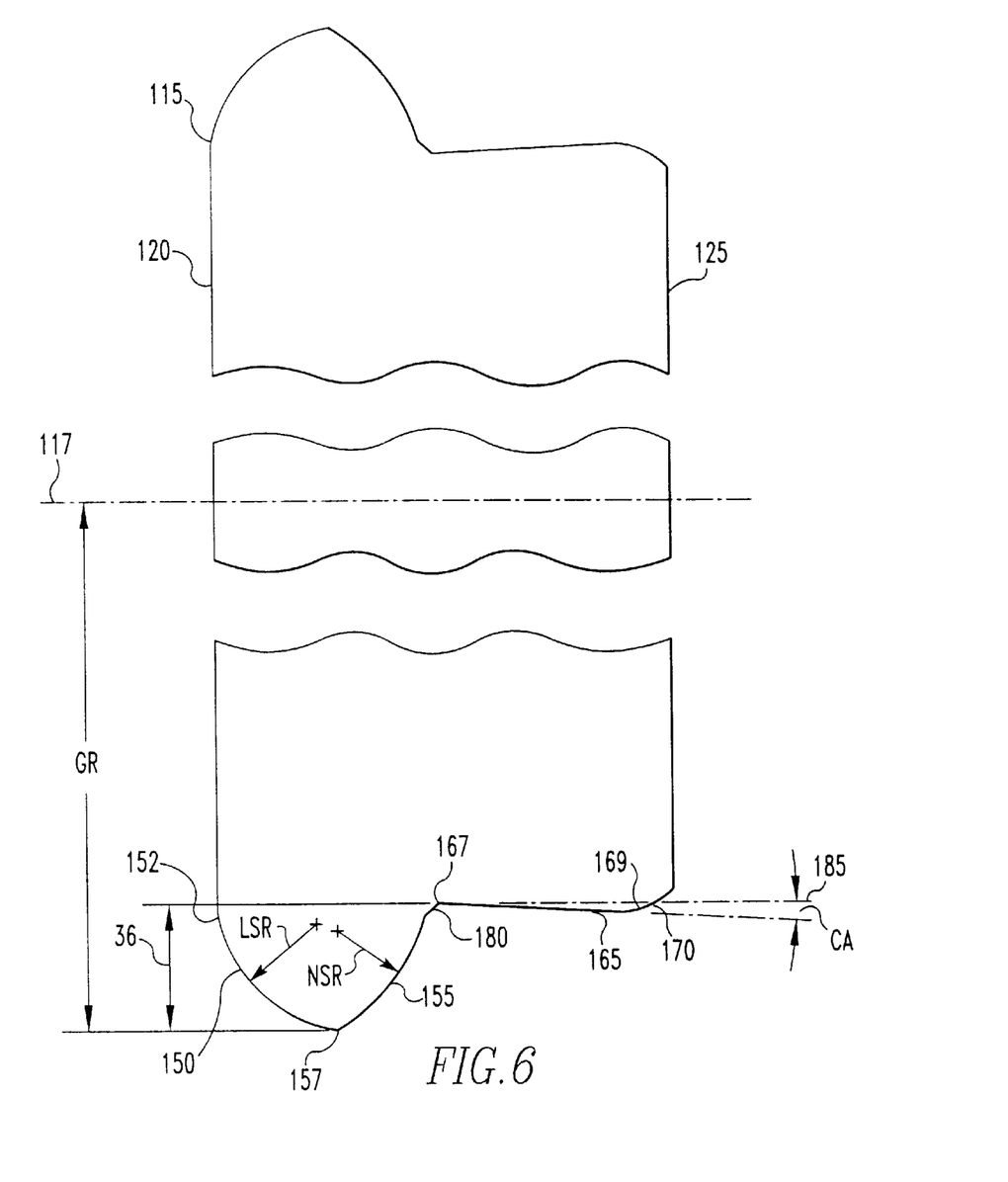
FIG. 6 illustrates a side view of the grinding wheel used to produce the cutting tool.

FIG. 6 illustrates a side view of a typical grinding wheel in accordance with the subject invention.

Certain portions of the edge 130 of the grinding wheel 110 are used to generate certain portions of the flute 35 and land 40 of the cutting tool 10, and for that reason the numbering for these particular items will be incremented by 100 from the associated part on the cutting tool 10.

The outer edge 130 is comprised of a lip shaper segment 150 extending in a lateral direction from the first side 120 and extending away from the disk centerline 117 a radial distance GR defining the radial depth 36 of the flute 35 (FIG. 4) to the outermost radial point 157.

A nose shaper segment 155 is adjacent to the lip shaper segment 150 and extends in a lateral direction toward the second side 125 and extends inwardly toward the disk centerline 117. Point 157 is also the point of intersection between the lip shaper segment 150 and the nose shaper segment 155.

A clearance shaper segment 165 extends from the nose shaper segment 155 toward the second side 125.

Finally, a margin relief shaper segment 170 is adjacent to the clearance shaper segment 165 and extends in a lateral direction toward the second side 125 and furthermore extends toward the disk centerline 117.

In one embodiment, the slope of the lip shaper segment 150 and the slope of the nose shaper segment 155 at their point of intersection 157 are not equal.

It is possible for a portion 152 of the lip shaper segment 150 closest to the first side 120 to be parallel to the first side 120. In general, for grinding wheels such as grinding wheel 110, it is typical for the first side 120 and the second side 125 to be straight and parallel to one another.

As illustrated in FIG. 6, the lip shaper segment 150 may have a convex shape. The lip shaper segment 150 may have a radius LSR of between 30 to 60% of the outer radius OR of the cutting tool 10. In the alternative, it is possible for the lip shaper segment 150 to be straight.

Additionally, as illustrated in FIG. 6, the nose shaper segment 155 may be convex. The nose shaper segment 155 may have a radius NSR of between 20 to 90 percent of the outer radius OR of the cutting tool 10. In the alternative, it is also possible for the nose shaper segment 155 to be straight.

Briefly returning to FIG. 1, it is typical in a cutting tool, such as the twist drill 10, for the margin 70 to have the largest radius of any part of the cutting tool 10. It is common for the radius of the margin 70 to have a radius identical to that of the shaft 15 which essentially may be the outer radius OR of the original blank. Therefore, it is possible to produce the margin 70 on the cutting tool 10 by shaping the areas adjacent to the margin and leaving the outermost surface of the margin untouched.

Returning attention to FIG. 6, a transition segment 180 may extend from the nose shaper segment 155 to the clearance shaper segment 165 wherein the transition segment 180 is spaced inwardly from the outermost point 157 of the disk 115 a distance greater than the depth 36 of the flute 35. In this fashion, the transition segment 180 is spaced from the outermost surface of the cutting tool 10 and does not contact the external surface 30. The transition segment 180 may be positioned closer in the radial direction to the outermost point 157 to debur the region at the intersection of the nose 55 and clearance portion 65.

The margin relief shaper segment 170 may be straight or, as illustrated in FIG. 6, the margin relief shaper segment 170 may be convex and have a radius of between 80 to 160% of the outer radius OR of the cutting tool 10.

The clearance shaper segment 165 is bounded by two end points 167 and 169. A line connecting these two end points 167, 169 of the clearance shaper segment 165 defines a clearance angle CA of preferably between 0–15° with a line 185 parallel to the centerline 117 of the disk 115. In one embodiment, for a wheel having a radius GR of 9 inches, a typical clearance angle CA would be 10°.

The clearance shaper 165 may be straight or curved. In the event it is curved, it may be convex in shape and have a radius of between 8 to 50 times the outer radius OR of the cutting tool 10.

The margin relief shaper segment 170, as illustrated in FIG. 6, is angled relative to the centerline 117. In particular, the margin relief shaper segment 170 may be linear and may form an angle MA with a line 185 parallel to the disk centerline 117 of between 30° and 90°. The margin relief shaper segment 170 provides relief to the margin in the region adjacent to the clearance portion 65 of the drill 10.

In yet another embodiment, the disk outer edge 130 may further include a fillet shaper segment (not shown) centered about the end point 169 of the clearance shaper segment 170 whereby the fillet shaper segment may have a convex shape extending between the margin shaper segment 170 and the clearance shaper segment 165.

In one embodiment of the subject invention, the grinding wheel 110 may have a radius GR of 9 inches and a width GW of 0.373 inch. The lip shaper segment 150 extends from the first side 120 and away from the longitudinal axis 118 and has a convex shape with a radius LSR of 0.119 inch wherein the beginning portion of the lip shaper segment 150 is tangent to the first side 120 of the wheel 110. The lip shaper segment 150 extends from the first side 120 a lateral distance of 0.100 inch. The nose shaper segment 155 is adjacent to the lip shaper segment 150 and extends toward the second side 125. The nose shaper segment 155 is convex with a radius of 0.165 inch. The nose shaper segment 155 extends to a point 0.157 inch laterally from the first side 120. A transition segment 180, which is linear, extends from the nose shaper segment 155 to the clearance shaper segment 160. The transition segment 180 extends a lateral distance of 0.019 inch in a direction away from the first side 120 and a radial distance of 0.024 inch toward the longitudinal axis 117. The clearance shaper segment 165 extends from the transition segment 180 a distance of 0.116 inch in a lateral direction away from the first side 120 and a radial distance of 0.003 inch away from the axis 117. The margin relief shaper segment 170 extends in a direction away from the first side 120 a lateral distance of 0.255 inch and has a convex radius of 0.126 inch.

Figure 7:
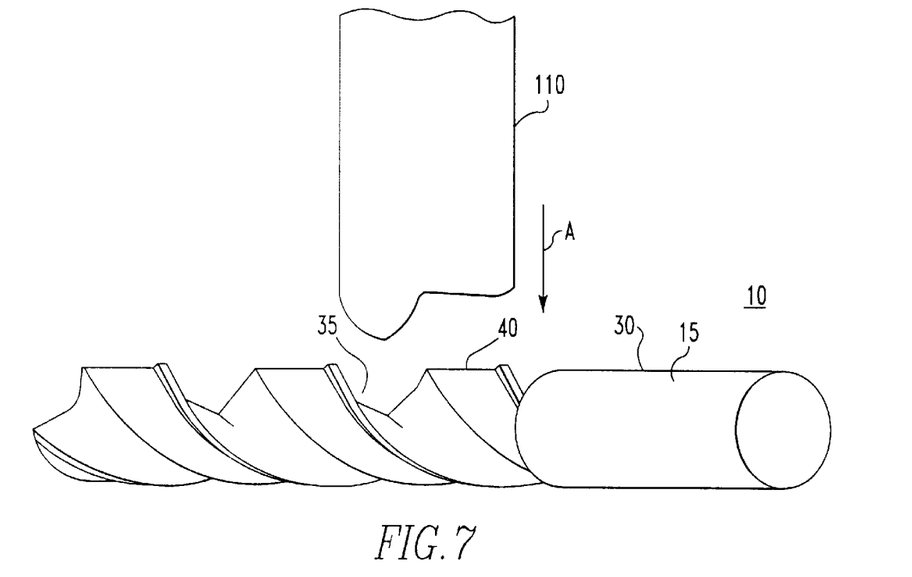
FIG. 7 illustrates a view along the offset angle of the grinding wheel and cutting tool of FIG. 5, spaced from one another to highlight their features.

FIG. 1 illustrates a perspective view of a prior art drill that may be fabricated in accordance with the method and apparatus of the subject invention. FIG. 7 illustrates a view of the same drill with the grinding wheel 110 that may be utilized to produce the flute 35 and land 40 of that drill 10. For purposes of illustration, the grinding wheel 110 is spaced from the drill 10. However, the drill 10 is aligned properly such that lateral displacement of the grinding wheel,110 will properly position the grinding wheel 110 relative to the cutting tool 10. In actual operation, the grinding wheel 110 is advanced into the external surface of the drill 10 in the direction A illustrated in FIG. 7. However, it should be appreciated that prior to such advancement, the flute 35 and land 40 are not yet formed in the body of the drill 10 and resemble the portion of the cylindrical shaft 15 illustrated to the right in FIG. 7.

Figure 8:
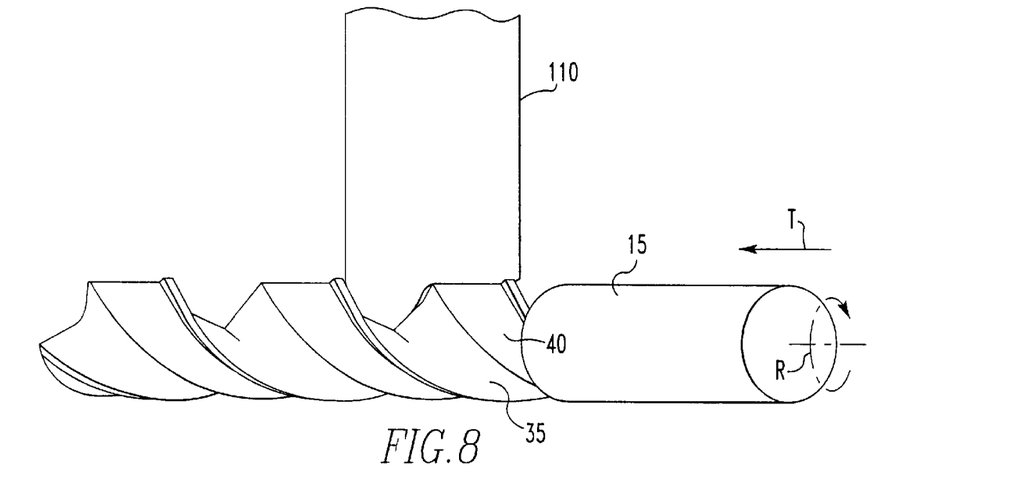
FIG. 8 illustrates a view along the offset angle of the grinding wheel and cutting tool of FIG. 5 contacting one another.

FIG. 8 illustrates the grinding wheel 110 positioned to fully grind the flute 35 and the land 40. During such an operation, the shaft 15 is rotated as illustrated by arrow R and is simultaneously translated in the direction indicated by arrow T while the grinding wheel 110 rotates, thereby permitting the grinding wheel 110 to impart a helical flute 35 and associated land 40 to the shaft 15.

Method of Producing Cutting Tool

Unlike previous techniques which required the utilization of two separate grinding wheels to create a helical flute and associated land, in one embodiment of the subject invention a single grinding wheel may be utilized to produce simultaneously both the flute and land with a margin.

Figure 9:
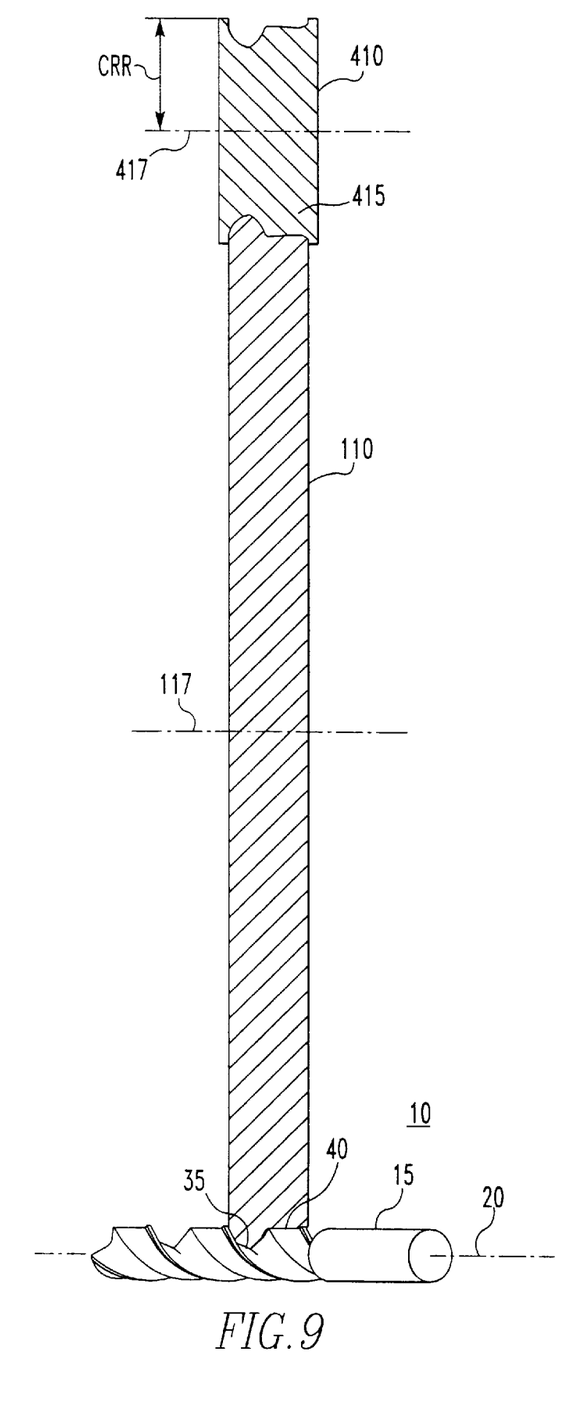
FIG. 9 illustrates a crush roll acting upon the grinding wheel to shape the wheel.

In particular, a further embodiment of the subject invention addresses such a method. With reference again to FIG. 1 and further attention to FIGS. 9–10, a method is disclosed for producing a cutting tool 10 having a shaft 15 with a longitudinal axis 20. The cutting tool 10 is identical to that previously described with respect to FIG. 1. The method of fabricating this cutting tool comprises the steps of producing a flute 35 and land 40 of the cutting tool 10 by grinding the shaft 15 with at least one pass of a grinding wheel 110.

In operation, a grinding wheel having a radius of eight inches may be used to grind a drill having an outer radius of 0.25 inch. Under these circumstances, the grinding wheel may be rotated at a speed of between 1500–4000 RPM. At a speed of 2000 RPM, the drill may be axially fed (infeed) to the wheel at a rate of between four to six inches per minute. The helix angle typically is fixed for different grinding machines based upon the infeed rate and is a function of the rotational speed of the drill as it is fed to the wheel. However, other grinding machines may be adjusted to adjust the helix angle. Depending upon the power of the grinding machine, the grinding operation may be accomplished by a single pass of the grinding wheel at full depth or multiple passes with progressively greater depths.

As will be further discussed, a crush roll 410 having a mirror image of the outer edge 130 of the grinding wheel 110 (FIG. 6) may be urged against the grinding wheel 110, thereby imparting the shape of the crush roll 410 to the grinding wheel 110. This is especially beneficial in instances where the grinding wheel 110 is a resin-bonded grinding wheel which is flexible and, therefore, preferably must be frequently redressed.

Returning to FIG. 5, the flute 35 and land 40 extend around longitudinal axis 20 of the cutting tool 10 to define a helix angle HA which may preferably have a value of between 22° and 38°. As further illustrated in FIG. 5, the radius GR of the grinding wheel 110 is significantly larger than the outer radius OR of the cutting tool 10 such that the grinding wheel 110 contacts the cutting tool 10 at a point where the grinding wheel 110 is tangent to the cutting tool 10 but furthermore at a location in front of and behind this tangency point. As a result, to better control the grinding process, the grinding wheel 110 is offset relative to a longitudinal axis 118 extending through the grinding wheel 110. The grinding wheel 110 may be offset at an angle OA relative to the helix angle HA by an amount between 3°–4°.

Cutting Tool Product by Process

What has been described so far is a grinding wheel for producing a fluted cutting tool and a method for producing such a cutting tool.

The general concept of producing a helical fluted cutting tool utilizing a single grinding wheel is believed to be unique and, therefore, the product such as the cutting tool discussed herein is also believed to be unique as a result of this process.

Crush Roll Apparatus

The perfect grinding wheel operating under ideal conditions will be self-sharpening, such that as the abrasive grains become dull, they tend to fracture and will be dislodged from the wheel by the grinding forces, thereby exposing new sharp abrasive grains. Although in precision machine grinding this ideal sometimes may be partially attained, it is almost never attained completely. Usually the grinding wheel must be dressed and trued after mounting on the precision grinding machine spindle and periodically thereafter. One device for providing this feature is a crush roll, which may be a hardened steel or carbide roll and which also may be impregnated with diamonds. The crush roll is free to rotate and has the desired form of the grinding wheel. The crush roll is fed gradually into the grinding wheel which runs at a slow speed. The crush roll will, by crushing action, produce its reverse form in the wheel. The crush roll produces a free cutting wheel face with sharp grains. The preferred method of dressing the grinding wheel 110 in accordance with the subject invention involves the use of a crush roll 410 illustrated in FIGS. 9 and 10.

As will be seen, the profile of the crush roll 410 is a mirror image of the outer edge 130 of the grinding wheel 110.

Directing attention again to FIGS. 9 and 10 and to FIG. 1 for the cutting tool details, a crush roll 410 for dressing a grinding wheel 110 is disclosed wherein the grinding wheel 110 is used to produce the helical cutting tool 10 previously discussed.

The crush roll 410 is comprised of a disk 415 having a disk centerline 417 and an average radial size CRR. The disk 415 has a first side 420 and a second side 425 defining a width CW therebetween and a disk outer edge 430 between the sides 420, 425. The outer edge 430 has an abrasive material for dressing a grinding wheel 110 and wherein the outer edge 430 has a profile. The profile is defined by a lip former segment 450 which may have a concave shape and extends in a lateral direction from the first side 420 and furthermore extends toward the disk centerline 417 a radial distance equal to the radial depth 36 (FIG. 6) of the flute 35. The profile further comprises a nose former segment 455 adjacent to the lip former segment 450 and extending in a lateral direction toward the second side 425 and further extending outwardly from the disk centerline 417. A clearance former segment 465 is adjacent to the nose former segment 455 and extends in a lateral direction toward the second side 425 and furthermore may extend toward the disk centerline 417.

A margin relief former segment 470 is adjacent to the clearance former segment 465 and extends in a lateral direction toward the second side 425 and furthermore extends away from the disk centerline 417.

Figure 10:
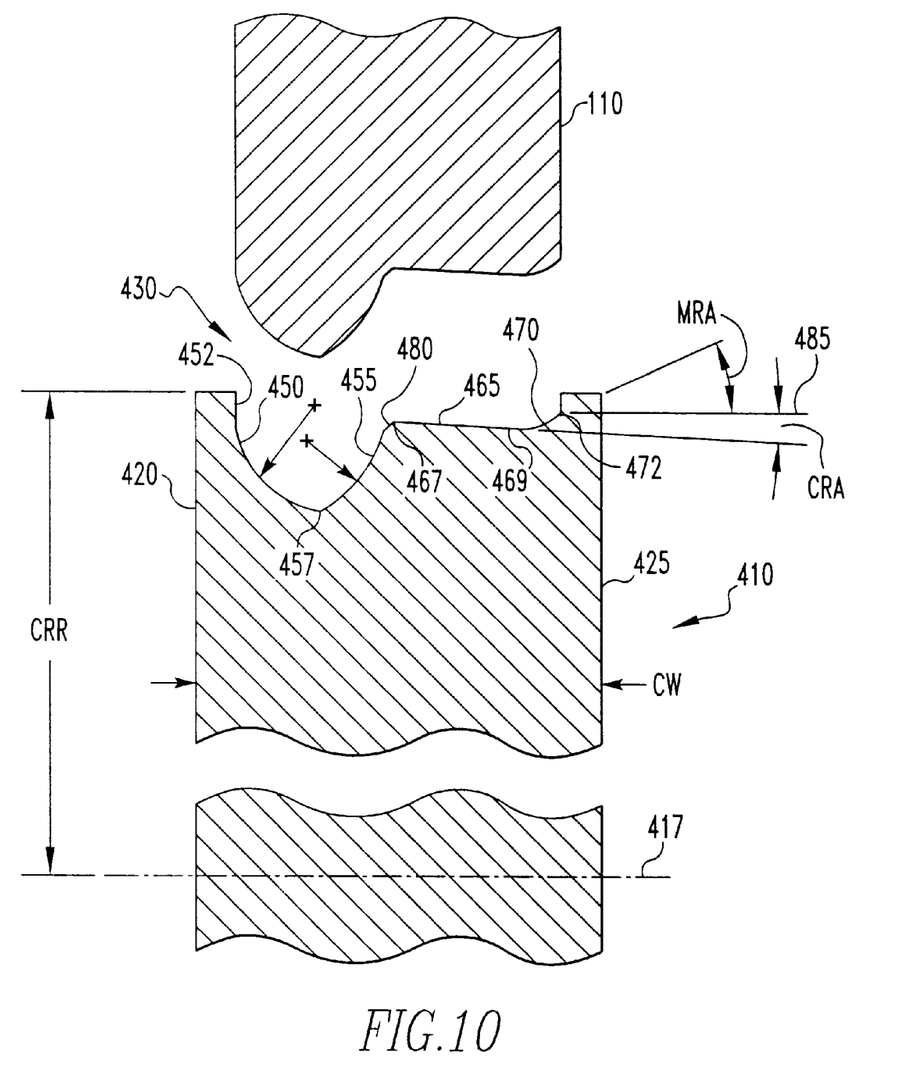
FIG. 10 illustrates the grinding wheel and crush roll of FIG. 9 spaced from one another to highlight their features.

As illustrated in FIG. 10, the profile of the outer edge 430 of the crush roll 410 is a mirror image of the outer edge 130 of the grinding wheel 110.

The slope of the lip former segment 450 and the slope of the nose former segment 455 at their point of intersection 457 may not be equal.

Additionally, a portion 452 of the lip former segment 450 closest to the first side 420 may be parallel to the first side 420. As illustrated in FIG. 10, the lip former segment 450 may have a concave shape. In particular, the lip former segment 450 may have a radius of between 30 to 60% of the outer radius OR of the cutting tool 10. In the alternative, the lip former segment 450 may be straight.

Additionally, the nose former segment 455 as illustrated in FIG. 10 may be concave. In such a case, the nose former segment 455 may have a radius of between 20 to 90% of the outer radius OR of the cutting tool 10. In the alternative, the nose former segment 455 may be straight.

The margin relief former segment 470 is straight or, in the alternative, as illustrated in FIG. 10, the margin relief former segment 470 may be concave. Under such circumstances, the margin relief former segment 470 may have a radius of between 80 to 160% of the outer radius OR of the cutting tool 10.

A line extending through the end points 469, 472 of the margin relief former segment 470 may form an angle MRA with a line 485 parallel to the disk centerline 417 of between 30° and 90°.

Directing attention to the clearance former segment 465, it is entirely possible for the clearance former segment 465, as illustrated in FIG. 10, to be straight. In the alternative, the clearance former segment 465 may be curved, either convex or concave, and have a radius of between 8 to 50 times the outer radius OR of the cutting tool 10. Additionally, whether the clearance former segment 465 is straight or curved, a line connecting two end points 467, 469 of the clearance former segment 465 defines a clearance angle CRA of between 0°–15° with a line 485 parallel to the centerline 417 of the disk 415.

As illustrated in FIG. 10, the crush roll 410 may also include a transition segment 480 between the nose former segment 455 and the clearance former segment 465 wherein the transition segment 480 is spaced radially from the outermost point of the disk 415 by a distance greater than the depth 36 of the cutting tool flute 35 (FIG. 6).

For a crush roll having an average radial size CCR of four inches, a preferred clearance angle CRA is 10°.

Just as the grinding wheel 110 may include a fillet shaper segment, so, too, may the crush roll 410 include a fillet former segment (not shown) having a concave shape at point 469 and extending between a linear margin former segment 470 and the clearance former segment 465.

What has just been described is a single grinding wheel for producing a cutting tool having flutes and margins along a helical axis, and a method for using such a grinding wheel. Finally, a crush roll used to dress the grinding wheel was disclosed.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalence thereof.

I claim:

1. A grinding wheel for producing a helical cutting tool having a shaft with a longitudinal axis, wherein the cutting tool shaft has a forward end and, when viewed in cross-section perpendicular to the longitudinal axis and spaced from the forward end, is comprised of a flute having a radial depth and a land adjacent to the flute wherein the flute and the land extend about the longitudinal axis of the shaft along a helix angle, wherein the flute has a lip extending to inwardly from an outer radius and a nose adjacent to the lip and wherein each land has a clearance portion adjacent to the nose and a margin adjacent to the clearance portion, wherein the grinding wheel is comprised of:

a disk having a disk centerline and an average radial size, a first side and a second side defining a width therebetween and a disk outer edge between the sides, wherein the outer edge has an abrasive material for grinding a cutting tool and wherein the edge has a profile defined by:
  a) a lip shaper segment extending in a lateral direction from the first side and extending away from the disk centerline a radial distance defining the radial depth of the flute;
  b) a nose shaper segment adjacent to the lip shaper segment and extending in a lateral direction toward the second side and extending inwardly toward the disk centerline;
  c) a clearance shaper segment adjacent to the nose shaper segment and extending in a lateral direction toward the second side; and
  d) a margin relief shaper segment adjacent to the clearance shaper segment and extending in lateral direction toward the second side and extending toward the disk centerline.

2. The grinding wheel according to claim 1 wherein the slope of the lip shaper segment and the slope of the nose shaper segment at their point of intersection are not equal.

3. The grinding wheel according to claim 1 wherein a portion of the lip shaper segment closest to the first side is parallel to the first side.

4. The grinding wheel according to claim 1 wherein the lip shaper segment has a convex shape.

5. The grinding wheel according to claim 4 wherein the lip shaper segment has a radius of between 30 to 60 percent of the outer radius.

6. The grinding wheel according to claim 1 wherein the lip shaper segment is straight.

7. The grinding wheel according to claim 1 wherein the nose shaper segment is convex.

8. The grinding wheel according to claim 7 wherein the nose shaper segment has a radius of between 20 to 90 percent of the outer radius.

9. The grinding wheel according to claim 1 wherein the nose shaper segment is straight.

10. The grinding wheel according to claim 1 wherein at least one of the first margin relief shaper segment and the second margin relief shaper segment is convex.

11. The grinding wheel according to claim 10 wherein the margin relief shaper has a radius of between 80 to 160 percent of the outer radius.

12. The grinding wheel according to claim 1 wherein the margin shaper segment is, straight.

13. The grinding wheel according to claim 1 wherein the margin relief shaper segment is linear and forms an angle with a line parallel to the disk centerline of between 30° and 90°.

14. The grinding wheel according to claim 1 wherein the clearance shaper segment is curved.

15. The grinding wheel according to claim 14 wherein the clearance shaper segment has a radius of between 8 to 50 times the outer radius.

16. The grinding wheel according to claim 1 wherein the clearance shaper segment is straight.

17. The grinding wheel according to claim 1 wherein a line connecting two end points of the clearance shaper segment defines a clearance angle of between 0–15° with a line parallel to the centerline of the disk.

18. The grinding wheel according to claim 1 further including a transition segment between the nose shaper segment and the clearance shaper segment, wherein the transition segment is spaced inwardly from the outermost point of the disk a distance greater than the depth of the cutting tool flute.

19. The grinding wheel according to claim 1 wherein the relief margin further includes a fillet shaper segment having a convex shape located in the region adjacent to the clearance shaper segment.

20. A grinding wheel for producing a helical cutting tool having a shaft with a longitudinal axis, wherein the cutting tool shaft has a forward end and, when viewed in cross-section perpendicular to the longitudinal axis and spaced from the forward end, is comprised of a flute having a radial depth and a land adjacent to the flute, wherein the flute and land extend about the longitudinal axis of the shaft along a helix angle, wherein the flute has a lip extending inwardly from an outer radius and a nose adjacent to the lip and wherein each land has a clearance portion adjacent to the nose and a margin adjacent to the clearance portion, wherein the grinding wheel is comprised of:

a disk having a disk centerline and an average radial size, a first side and a second side defining a width therebetween and a disk outer edge between the sides, wherein the outer edge has an abrasive material for grinding a cutting tool and wherein the edge has a profile defined by:
  a) a lip shaper segment extending in a lateral direction from the first side and extending away from the disk centerline a radial distance defining the radial depth of the flute;
  b) a nose shaper segment adjacent to the lip shaper segment and extending in a lateral direction toward the second side and extending inwardly toward the disk centerline;
  c) a clearance shaper segment extending from the nose shaper segment toward the second side, wherein a line connecting two end points of the clearance shaper segment defines a clearance angle of between 0–15 degrees with a line parallel to the centerline of the disk;
  d) a margin relief shaper segment adjacent to the clearance shaper segment and extending in a lateral direction toward the second side and extending toward the disk centerline; and
  e) wherein the slope of the lip shaper segment and the slope of the nose shaper segment at their point of intersection are not equal.

21. A method of producing a helical cutting tool having a shaft with a longitudinal axis, wherein the cutting tool shaft has a forward end and, when viewed in cross-section perpendicular to the longitudinal axis and spaced from the forward end, has a flute with a radial depth and has a land adjacent to the flute, wherein the flute and the land extend about the longitudinal axis of the shaft along a helix angle, wherein the flute has a lip extending inwardly from an outer radius and a nose adjacent to the lip and wherein each land has a clearance portion adjacent to the nose and a margin adjacent to the clearance portion, and wherein the method comprises the step of:
  a) producing both the flute and land of the cutting tool by grinding the shaft with at lease one pass of a grinding wheel.

22. The method according to claim 21 wherein producing both the flute and the land with the grinding wheel further includes urging the grinding wheel against a crush roll having a mirror image of the desired grinding wheel edge shape, thereby imparting the shape of the crush roll to the grinding wheel.

23. The method according to claim 21 wherein the helix angle of the cutting tool is between 22–38° and wherein the grinding wheel is offset at an angle relative to the helix angle of between 3–4°.

24. A method of producing a cutting tool having a shaft with a longitudinal axis, wherein the cutting tool shaft has a forward end and, when viewed in cross-section perpendicular to the longitudinal axis and spaced from the forward end, has a flute with a radial depth and has a land adjacent to the flute, wherein the flute and the land extend about the longitudinal axis of the shaft along a helix angle and wherein the flute has a lip extending inwardly from an outer radius and a nose adjacent to the lip and wherein each land has a clearance portion adjacent to the nose and a margin adjacent to the clearance portion and wherein the method comprises the steps of:

a) producing both the flute and land of the cutting tool by grinding the shaft with at lease one pass of a single grinding, and     b) producing in the same at least one pass with the same grinding wheel a margin relief segment between the margin and the clearance portion.

25. A cutting tool having a shaft with a longitudinal axis and a forward end and, when viewed in cross-section perpendicular to the longitudinal axis and spaced from the forward end, comprised of a flute having a radial depth and a land adjacent to the flute, wherein the flute and land extend about the longitudinal axis of the shaft along a helix angle, and wherein the flute has a lip extending inwardly from an outer radius and a nose adjacent to the lip and wherein each land has a clearance portion adjacent to the nose and a margin adjacent to the clearance portion, wherein the cutting tool is produced with a method comprising the step of:

a) producing both the flute and land of the cutting tool by grinding the shaft with at least one pass of a grinding wheel.

26. The cutting tool produced according to the method of claim 25, wherein the method further comprises the step of:

b) producing in the same at least one pass with the same grinding wheel a margin relief segment between the margin and the clearance portion.

27. A crush roll for dressing a grinding wheel, wherein the grinding wheel is used to produce a helical cutting tool having a shaft with a longitudinal axis, wherein the cutting tool shaft has a forward end and, when viewed in cross-section perpendicular to the longitudinal axis and spaced from the forward end, is comprised of a flute having a radial depth and a land adjacent to the flute, wherein the flute and the land extend about the longitudinal axis of the shaft along a helix angle and wherein the flute has a lip extending inwardly from an outer radius and a nose adjacent to the lip and wherein each land has a clearance portion adjacent to the nose and a margin adjacent to the clearance portion, wherein the crush roll is comprised of:

a disk having a disk centerline and an average radial size, a first side and a second side defining a width therebetween and a disk outer edge between the sides, wherein the sides and edge have an abrasive material for dressing a grinding wheel and wherein the edge has a profile defined by:

a) a lip former segment extending in a lateral direction from the first side and extending inwardly toward the disk centerline a radial distance defining the radial depth of the flute;

b) a nose former segment adjacent to the lip shaper segment and extending in a lateral direction toward the second side and extending outwardly from the disk centerline;

c) a clearance former segment adjacent to the nose former segment and extending in a lateral direction toward the second side; and     d) a margin relief former segment adjacent to the clearance former segment and extending in a lateral direction toward the second side and extending away from the disk centerline.

28. The crush roll according to claim 27 wherein the slope of the lip former segment and the slope of the nose former segment at their point of intersection are not equal.

29. The crush roll according to claim 27 wherein a portion of the lip former segment closest to the first side is parallel to the first side.

30. The crush roll according to claim 27 wherein the lip former segment is concave.

31. The crush roll according to claim 30 wherein the lip former segment has a radius of between 30 to 60 percent of the outer radius.

32. The crush roll according to claim 27 wherein the lip former segment is straight.

33. The crush roll according to claim 27 wherein the nose former segment is concave.

34. The crush roll according to claim 33 wherein the nose former segment has a radius of between 20 to 90 percent of the outer radius.

35. The crush roll according to claim 27 wherein the nose former segment is straight.

36. The crush roll according to claim 27 wherein the margin relief former segment is concave.

37. The crush roll according to claim 36 wherein the margin relief former segment has a radius of between 80 to 160 percent of the outer radius.

38. The crush roll according to claim 27 wherein the margin former segment is straight.

39. The crush roll according to claim 27 wherein the margin relief former segment is linear and forms an angle with a line parallel to the disk centerline of between 30° and 90°.

40. The crush roll according to claim 27 wherein the clearance former segment is curved.

41. The crush roll according to claim 40 wherein the clearance former segment has a radius of between 8–50 times the outer radius.

42. The crush roll according to claim 27 wherein the clearance former segment is straight.

43. The crush roll according to claim 27 wherein a line connecting two end points of the clearance former segment defines a clearance angle of between 0–15° with a line parallel to the centerline of the disk.

44. The crush roll according to claim 27 further including a transition segment between the nose former segment and the clearance former segment, wherein the transition segment is spaced inwardly from the outermost point of the disk a distance greater than the depth of the cutting tool flute.

45. The crush roll according to claim 27 wherein the relief margin further includes a fillet former segment having a concave shape located in the region adjacent to the clearance former segment.

46. A crush roll for producing a helical cutting tool having a shaft with a longitudinal axis, wherein the cutting tool shaft has a forward end and, when viewed in cross-section perpendicular to the longitudinal axis and spaced from the forward end, is comprised of a flute having a radial depth and a land adjacent to the flute, wherein the flute and land extend about the longitudinal axis of the shaft along a helix angle and wherein the flute has a lip extending inwardly from an outer radius and a nose adjacent to the lip and wherein each land has a clearance portion adjacent to the nose and a margin adjacent to the clearance portion, wherein the crush roll is comprised of:

a disk having a disk centerline and an average radial size, a first side and a second side defining a width therebetween and a disk outer edge between the sides, wherein the outer edge has an abrasive material for dressing a grinding wheel and wherein the edge has a profile defined by:

a) a lip former segment extending in a lateral direction from the first side and extending inwardly toward the disk centerline a radial distance defining the radial depth of the flute;

b) a nose former segment adjacent to the lip shaper segment and extending in a lateral direction toward the second side and extending outwardly from the disk centerline;

c) a clearance former segment adjacent to the nose former segment and extending in a lateral direction toward the second side, wherein a line connecting two end points of the clearance former segment defines a clearance angle of between 0–15° with a line parallel to the centerline of the disk;

d) a margin relief former segment adjacent to the clearance former segment and extending in a lateral direction toward the second side and extending away from the disk centerline; and e) wherein the slope of the lip former segment and the slope of the nose former segment at their point of intersection are not equal.

* * * * *